(12) United States Patent
Tsai et al.

(10) Patent No.: US 7,086,887 B2
(45) Date of Patent: Aug. 8, 2006

(54) COVER WITH GUIDING FUNCTION AND ELECTRICAL APPARATUS

(75) Inventors: Kun-Shiang Tsai, Taipei (TW); Chung-Ming Wang, Taipei (TW)

(73) Assignee: Asustek Computer Inc., Taipei (TW)

( * ) Notice: Subject to any disclaimer, the term of this patent is extended or adjusted under 35 U.S.C. 154(b) by 0 days.

(21) Appl. No.: 11/053,886

(22) Filed: Feb. 10, 2005

(65) Prior Publication Data
US 2005/0208814 A1    Sep. 22, 2005

(30) Foreign Application Priority Data
Mar. 19, 2004   (TW)   .............................. 93107596 A

(51) Int. Cl.
*H01R 13/62* (2006.01)

(52) U.S. Cl. ...................... 439/331; 439/160

(58) Field of Classification Search ................ 439/153, 439/157, 160, 326, 331, 630
See application file for complete search history.

(56) References Cited

U.S. PATENT DOCUMENTS

| | | | | |
|---|---|---|---|---|
| 4,070,081 A | * | 1/1978 | Takahashi | 439/372 |
| 4,241,966 A | * | 12/1980 | Gomez | 439/157 |
| 4,445,740 A | * | 5/1984 | Wallace | 439/152 |
| 4,447,101 A | * | 5/1984 | Gugliotti | 439/153 |
| 4,469,388 A | * | 9/1984 | Narozny | 439/153 |
| 4,531,795 A | * | 7/1985 | Sinclair | 439/152 |
| 6,102,721 A | * | 8/2000 | Seto et al. | 439/160 |
| 6,132,288 A | * | 10/2000 | Aerts | 450/38 |
| 6,343,945 B1 | * | 2/2002 | Liikanen | 439/160 |
| 6,888,724 B1 | * | 5/2005 | Shaie | 361/719 |

* cited by examiner

*Primary Examiner*—Thanh-Tam Le
(74) *Attorney, Agent, or Firm*—Birch, Stewart, Kolasch & Birch, LLP

(57) ABSTRACT

A cover comprises a first guide portion and a second guide portion. A side surface of the cover pivots to a case. When the cover closes, the cover mantles a moving component in a container of the case. The first guide portion is adjacent to a first side surface. When the cover opens, the first guide portion pushes the moving component to depart from a specific position in the container. The second guide portion is adjacent to a second side surface of the cover. When the cover closes, the second guide portion pushes the moving component to the specific position in the container. Moreover, in an electrical apparatus, a moving component is placed in a container thereof. The electrical apparatus includes a cover and a case in which the container is disposed. The cover has a side surface pivoting to the case. When the cover closes, the cover mantles the moving component in the container.

17 Claims, 6 Drawing Sheets

COVER WITH GUIDING FUNCTION AND ELECTRICAL APPARATUS

BACKGROUND OF THE INVENTION

1. Field of Invention

The invention relates to a cover and, in particular, to a cover that mantles a user ID card.

2. Related Art

The global system for mobile communications (GSM) requires a user to put in or replace subscriber identity module (SIM) card inside the case of a mobile phone before use. When the user applies for a phone number, he or she obtained a SIM card that contains a micro processing chip storing the identification information in order for the mobile phone user to communicate with others. Such information includes the phone number and phone bill.

To accommodate the SIM card, a structure is always provided in some portion of the mobile phone case. A common structure is shown in FIG. 1. The mobile phone case 10 has a container space 11 with several connection points 12 to the mobile phone circuit board. When installing the SIM card 13, its angle 131 has to be the same as the angle 111 of the container space 11 in order to smoothly and correctly put the SIM card 13 into the container space 11. This angle 111 is a foolproof design of the SIM card 13. If the SIM card 13 is correctly put inside the container space 11, its connection points 132 will be electrical communications with the corresponding connection points 12 of the circuit board on the mobile phone. This correct position is called the specific position of the SIM card 13 hereinafter.

FIG. 1 shows a conventional fixing structure of the SIM card. It uses a container space to fix the position of the SIM card 13. When installing or uninstalling the SIM card 13, the user has to use his/her fingers to push the SIM card 13 into or out of the container space 11. However, such a method does not guarantee a firm electrical contact between the connection points 132 of the SIM card 13 and those 12 of the circuit board on the mobile phone. This results in errors when turning on the mobile phone. Moreover, using fingers to install or uninstall the SIM card 13 is inconvenient.

Therefore, it is imperative to provide a SIM card fixing structure that is easy to install or uninstall SIM cards and solves the above-mentioned drawbacks.

SUMMARY OF THE INVENTION

In view of the foregoing, the invention is to provide a cover that facilitates the installation and uninstallation of a SIM card.

To achieve the above, a cover of the invention comprises a first guide portion and a second guide portion. A side surface of the cover pivots to a case. When the cover closes, the cover mantles a moving component in a container of the case. The first guide portion is adjacent to a first side surface. When the cover opens, the first guide portion pushes the moving component to depart from a specific position in the container. The second guide portion is adjacent to a second side surface of the cover. When the cover closes, the second guide portion pushes the moving component to the specific position in the container.

To achieve the above, an electrical apparatus of the invention has a moving component placed in a container thereof. The electrical apparatus includes a cover and a case in which the container is disposed. The cover has a side surface pivoting to the case. When the cover closes, the cover mantles the moving component in the container.

As described above, the cover of the invention uses the first guide portion and the second guide portion to uninstall and install the SIM card. Therefore, the user does not need to use fingers to do the job. Moreover, the invention can correctly install the SIM card to the specific position, ensuring correct installation.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings, which are given by way of illustration only, and thus are not limitative of the present invention, and wherein.

DETAILED DESCRIPTION OF THE INVENTION

The present invention will be apparent from the following detailed description, which proceeds with reference to the accompanying drawings, wherein the same references relate to the same elements.

A side surface of the cover according to a preferred embodiment of the invention pivots to a case. When the cover closes, it mantles a moving component in a container.

Figure 1:
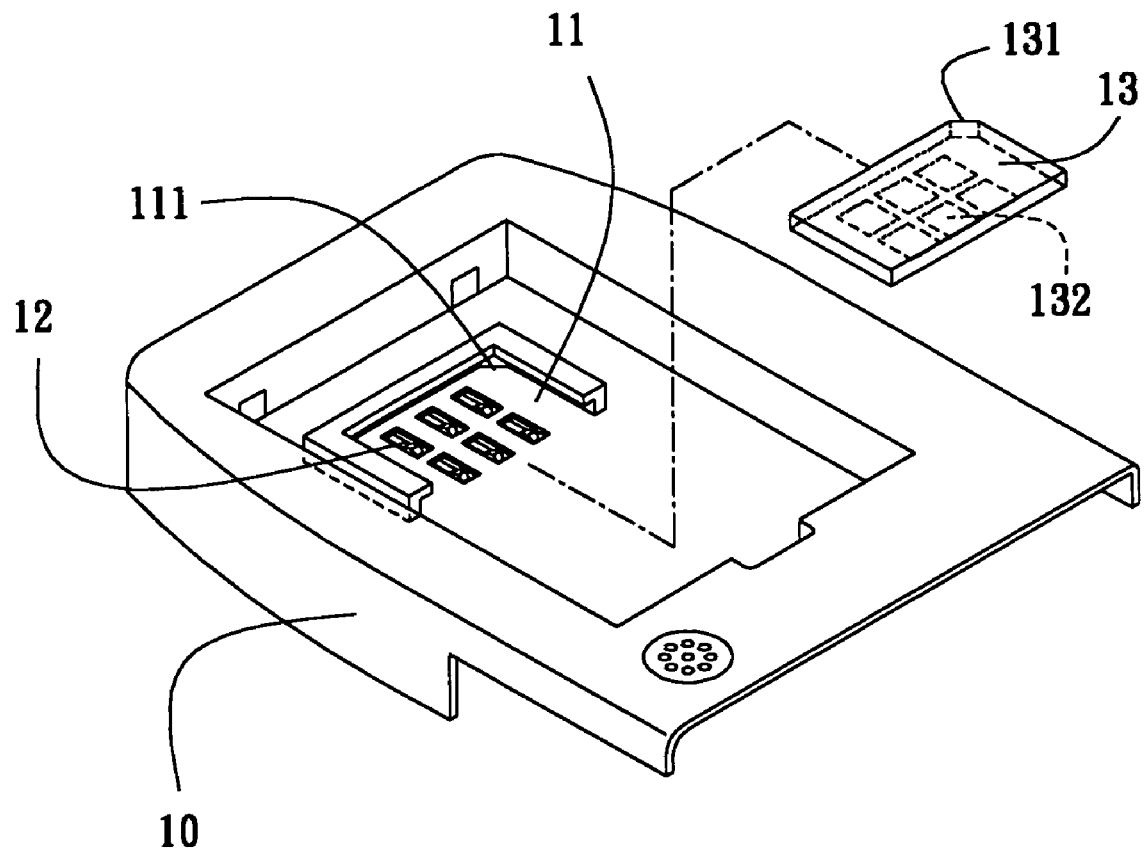
FIG. 1 is a schematic view of a conventional SIM card fixing structure.
Figure 2:
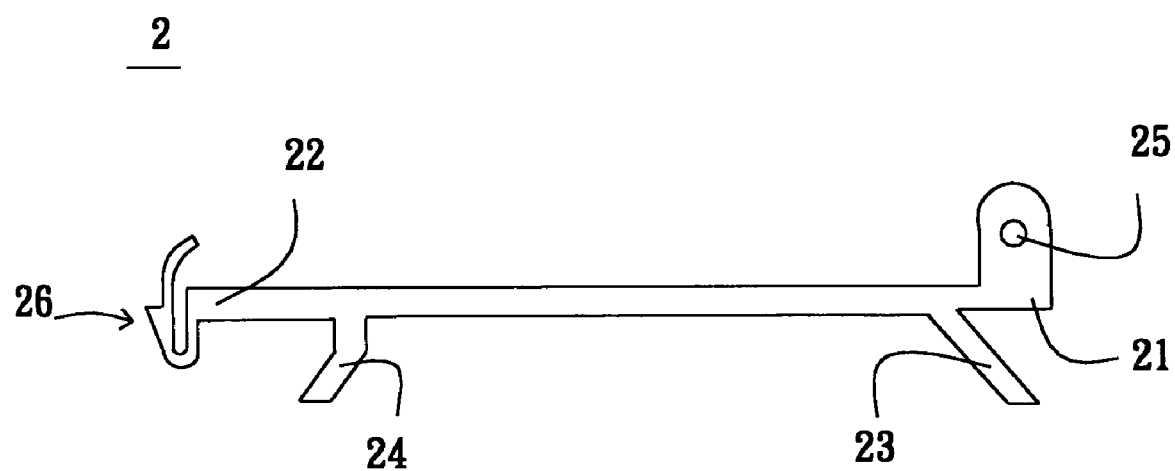
FIG. 2 is a side view of a cover according to a preferred embodiment of the invention.

As shown in FIG. 2, a cover 2 has a first side 21 and a second side 22 opposite to each other. A first guide portion 23 is adjacent to the first side 21. In this embodiment, the first guide portion 23 is a protruding part and has an angle with respect to the first side 21. For example, the first guide portion 23 is a guide plate protruding from the cover 2 and having an angle with respect to the cover 2. Its shape can be a rectangle. A second guide portion 24 is adjacent to the second side 22. In this embodiment, the second guide portion 24 is a protruding part and has an angle with respect to the cover 2. For example, the second guide portion 24 is a guide plate protruding from the cover 2 at angle. In this embodiment, both the first guide portion 23 and the second guide portion 24 have acute angles with respect to the first side 21 and the second side 22.

The cover 2 further contains a connection hole 25 and a hooking portion 26. The connection hole 25 is installed in the vicinity of the first side 21. The hooking portion 26 is installed in the vicinity of the second side 22. In this embodiment, the connection hole 25 is a circular hole on the first side 21. The hooking portion 26 is a U-shaped hooking portion. Here the hooking portion 26 is flexible. In this embodiment, the hooking portion 26 includes a protruding block to hook with a corresponding concave part on the case.

Figure 3:
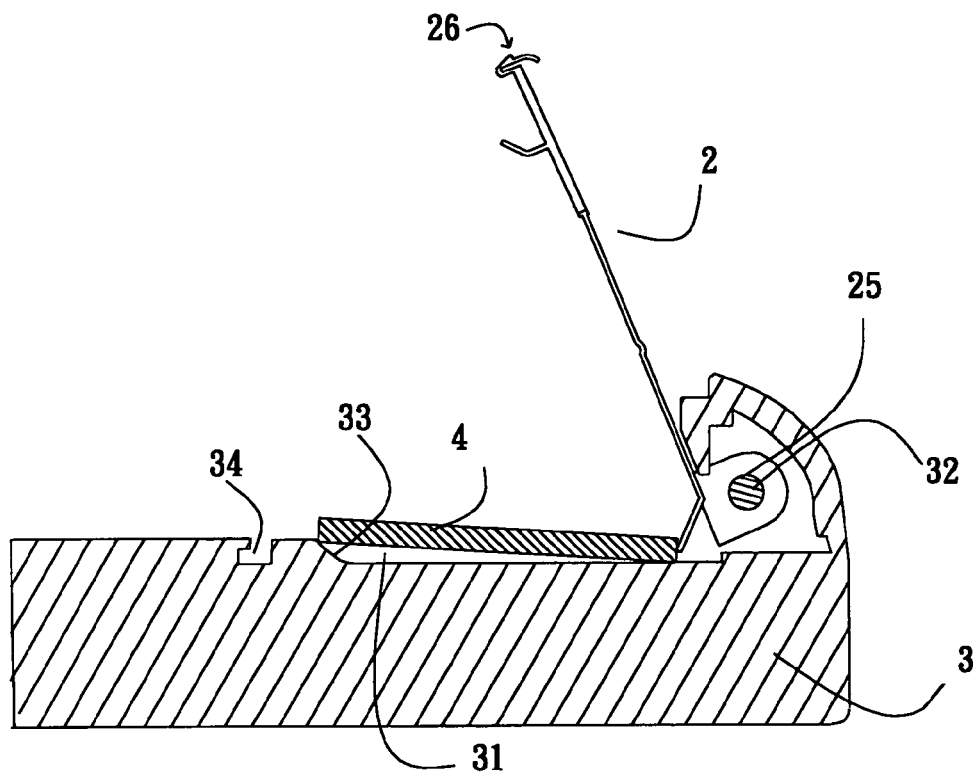
FIG. 3 is a schematic view of the cover according to the preferred embodiment of the invention.

As shown in FIG. 3, a case 3 has a container 31 and a slant surface 33. The container 31 accommodates a moving component 4. In this embodiment, the moving component 4 is a SIM card. The container 31 is the SIM card container of a mobile electrical apparatus.

Figure 4:
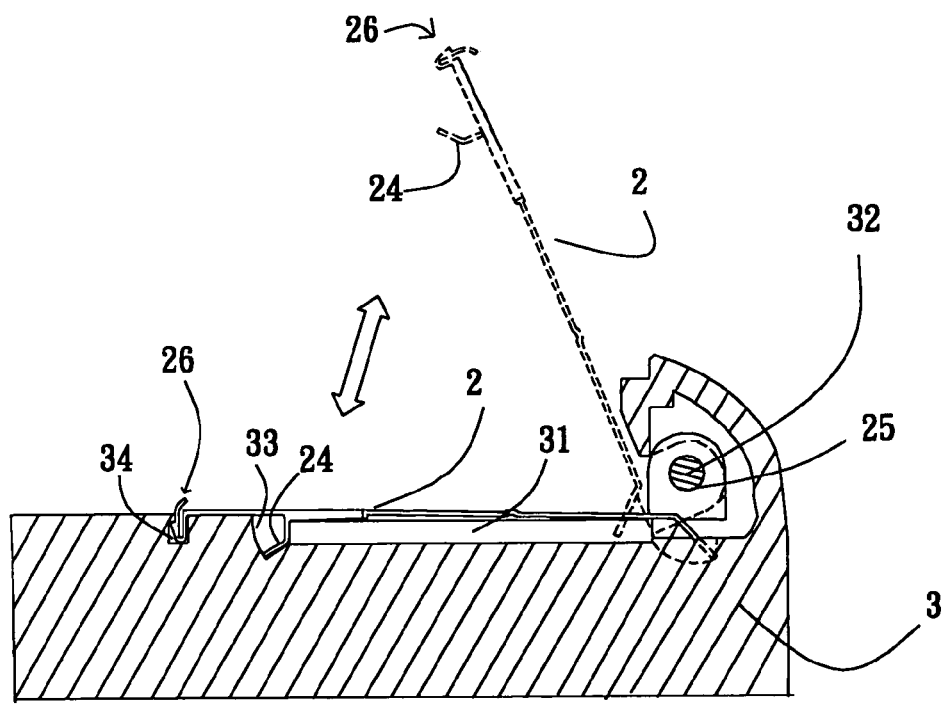
FIG. 4 is a schematic view of the actions of the cover according to the preferred embodiment of the invention.

With simultaneous reference to FIGS. 3 and 4, the case 3 further includes an axis 32 for the cover 2 to pivots about the axis 32 up and down. In this embodiment, the axis 32 is installed in the connection hole 25. The slant surface 33 is formed on one side of the container 31. When the cover 2 and the case 3 connect each other, the hooking portion 26 hooks onto the concave part 34. The slant surface 33 and the second guide portion 24 are opposite to each other.

Figure 5A:
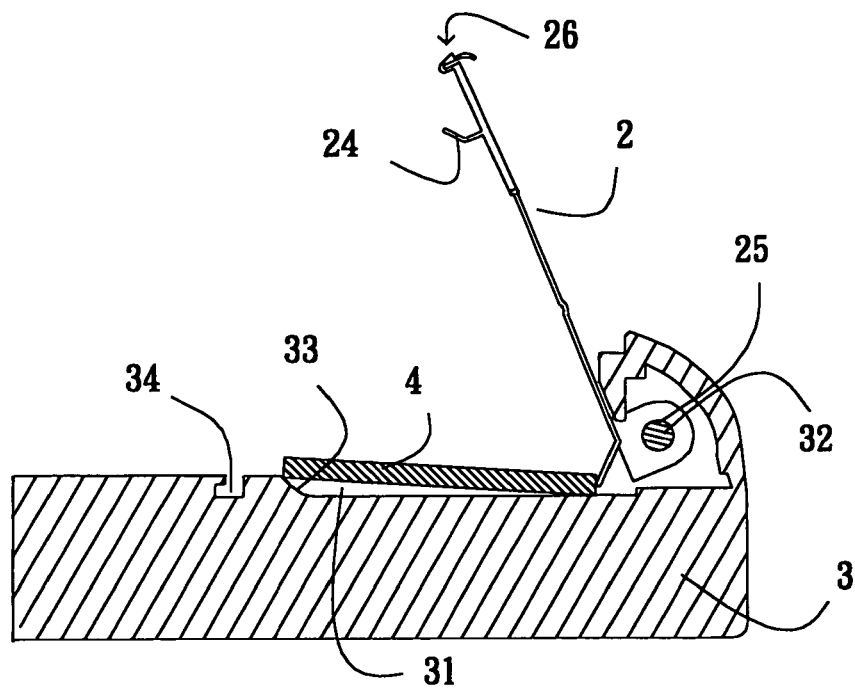
FIGS. 5a, 5b, and 5c are a set of schematic views showing a preferred embodiment of the invention.
Figure 5B:
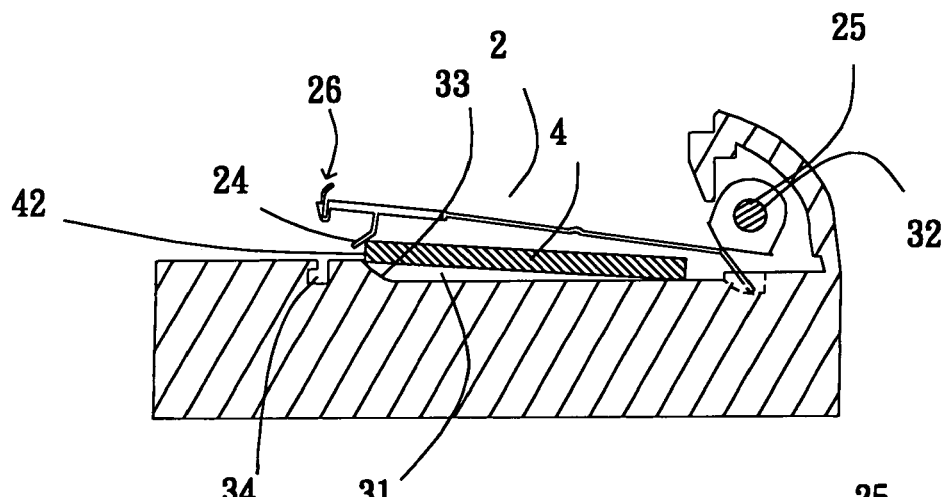
Figure 5C:
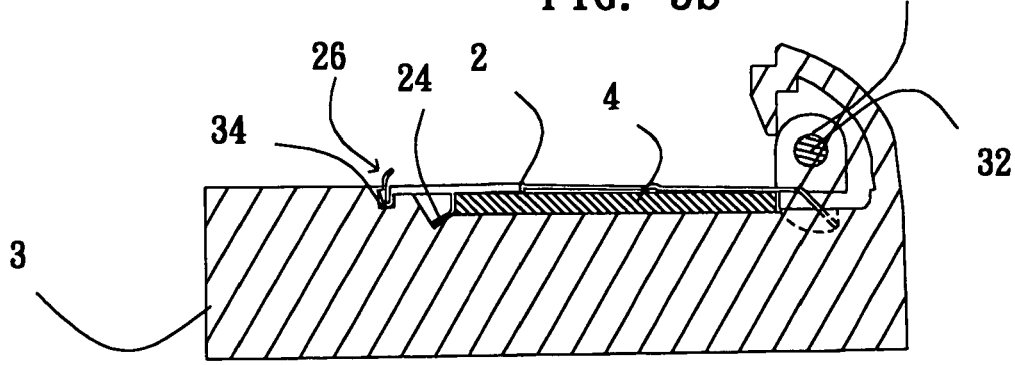

As shown in FIG. 5a, the moving component 4 is put inside the container 31. At this moment, the moving component 4 has not reached its specific position. The user then presses the hooking portion 26 for the cover 2 to pivot down. As shown in FIG. 5b, the second guide portion 24 is in contact with a second surface 42 of the moving component 4. With simultaneous reference to FIGS. 5a and 5b, as the cover 2 pivots down the second guide portion 24 is driven to push the moving component 33 into the container 31. The moving component 4 is pushed into the specific position due to the continual pivoting of the cover 2. As shown in FIG. 5c, the cover 2 finally mantles the moving component 4 in the container 31. The hooking portion 26 and the concave part 34 connect together to complete the installation of the moving component 4 inside the container 31.

Figure 6A:
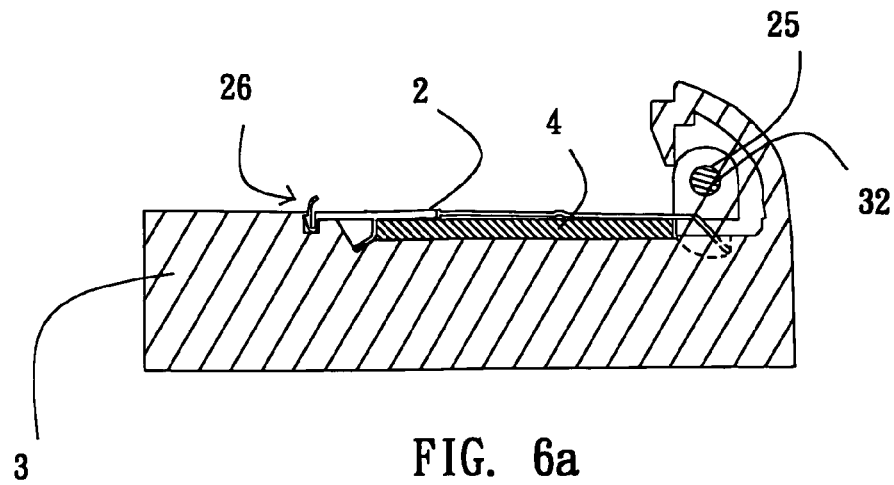
FIGS. 6a, 6b, and 6c are another set of schematic views showing the cover according to the preferred embodiment of the invention.
Figure 6B:
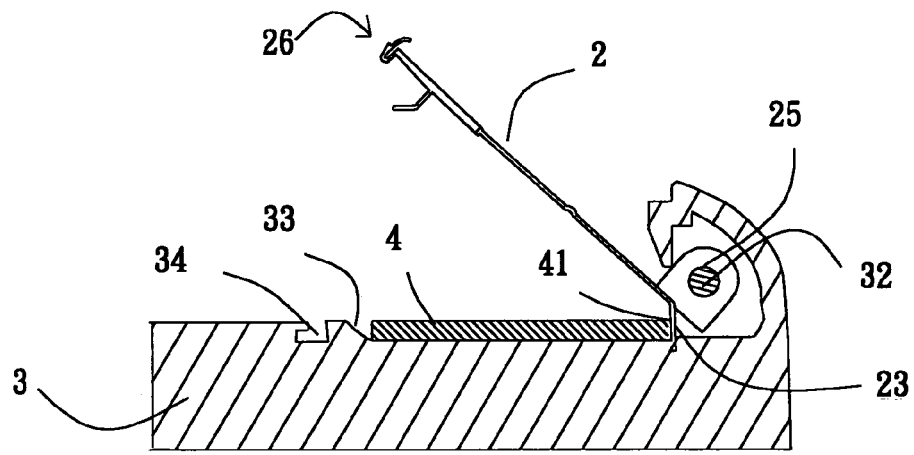
Figure 6C:
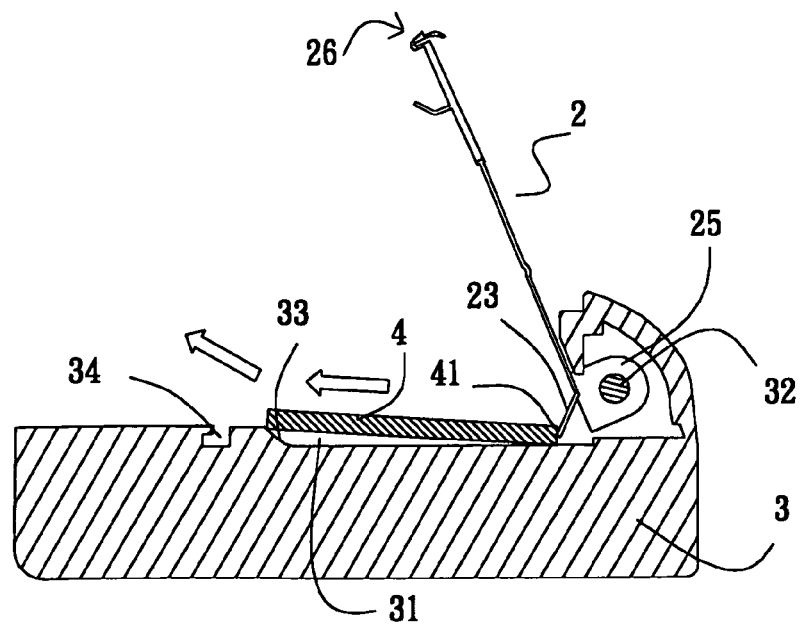

As shown in FIGS. 6a and 6b, to take out the moving component 4 from the specific position in the container, the cover 2 first pivots up for the first guide portion 23 to contact with a first surface 41 of the moving component 3. As shown in FIG. 6c, as the cover 2 further pivots upward the first guide portion 23 pushes the moving component 4 to slide along the slant surface 33 out of the container 31, escaping from the cover 2. With the help of the slant surface 33, it becomes easier for the user to take out the moving component 4 from the container 31.

Figure 7A:
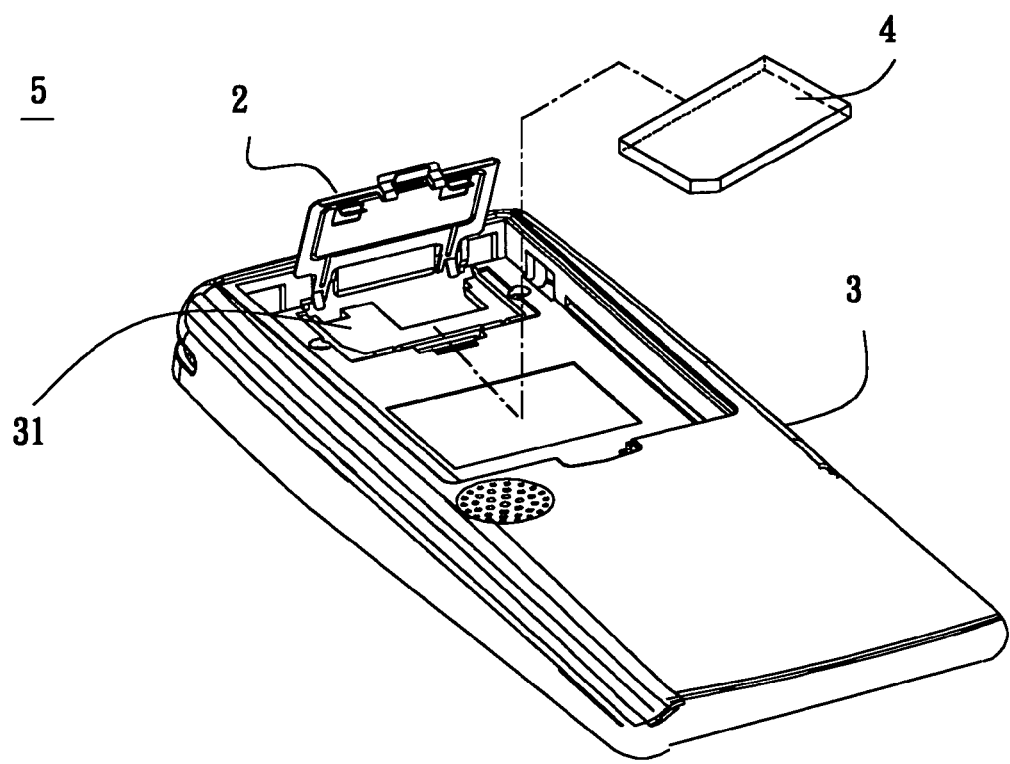
FIGS. 7a and 7b are schematic views of an electrical apparatus according to a preferred embodiment of the invention.

As shown in FIG. 7a, an electrical apparatus 5 according to a preferred embodiment of the invention includes a case 3 and a cover 2. A moving component 4 is disposed in a container 31 of the electrical apparatus 5. The structures of the moving component 4, the container 31, and the cover 2 in this embodiment are generally same as those in the previous embodiment. Therefore, we use the same numerical references and skip detailed descriptions of them hereinafter.

The container 31 is provided in one portion inside the case 3. In this embodiment, the case 3 is a mobile electrical apparatus case. The moving component 4 is a SIM card. The container 31 is the SIM card container of the mobile electrical apparatus.

Figure 7B:
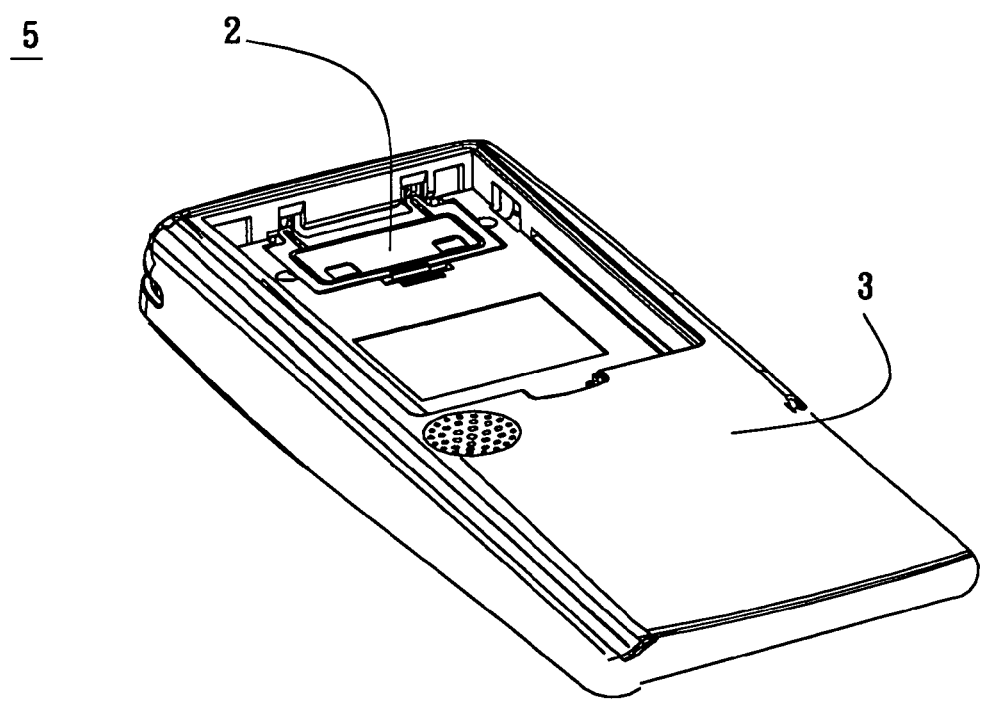

With simultaneous reference to FIGS. 7a and 7b, the installation of the moving component 4 in the container 31 is the same as in the previous embodiment. Thus, we skip a detailed description thereof.

In summary, using the first guide portion and the second guide portion disclosed in the invention, one can quickly and correctly install and uninstall a SIM card in a container.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A cover pivoted to a case with a container to propel a moving component so that the moving component is mantled in the container, the cover comprising:
   a first guide portion adjacent to a first side of the cover to push the moving component away from a specific position in the container when the cover opens; and
   a second guide portion adjacent to a second side of the cover to push the moving component to the specific position of the container when the cover closes; wherein the moving component is completely inside the container when the moving component is disposed at the specific position.

2. The cover of claim 1, wherein the first guide portion is a protruding part protruding from the cover to the container, and, as the cover opens, the protruding part gets into contact with a first surface of the moving component and pushes the moving component away from the specific position.

3. The cover of claim 1, wherein the second guide portion is a protruding part protruding from the cover to the container, and, as the cover closes, the protruding part gets into contact with a second surface of the moving component and pushes the moving component to the specific position.

4. The cover of claim 1, wherein the case includes a slant surface on one side of the container and, when the cover, and the case close, the slant surface is opposite to the second guide portion.

5. The cover of claim 1, wherein the first guide portion and the first side have an acute angle, and the second guide portion and the second side have an acute angle.

6. The cover of claim 1, further comprising a connection hole for the installation of an axis on the case.

7. The cover of claim 1, further comprising a hooking portion for the cover to hook onto the case.

8. The cover of claim 1, wherein the container is a SIM card container of a mobile electrical apparatus and the moving component is a SIM card.

9. An electrical apparatus for accommodating a moving component, comprising:

a case which has a container for accommodating the moving component; and a cover, which is pivoted to the case, the moving component being propelled by the cover to mantle the moving component in the container, the cover including:

a first guide portion adjacent to a first side of the cover to push the moving component away from a specific position in the container when the cover opens; and a second guide portion adjacent to a second side of the cover to push the moving component to the specific position of the container when the cover closes; wherein the moving component is completely inside the container when the moving component is disposed at the specific position.

10. The electrical apparatus of claim 9, wherein the first guide portion is a protruding part protruding from the cover to the container, and, as the cover opens, the protruding part gets into contact with a first surface of the moving component and pushes the moving component away from the specific position.

11. The electrical apparatus of claim 9, wherein the second guide portion is a protruding part protruding from the cover to the container, and, as the cover closes, the protruding part gets into contact with a second surface of the moving component and pushes the moving component to the specific position.

12. The electrical apparatus of claim 9, wherein the case includes a slant surface on one side of the container, and, when the cover and the case close, the slant surface is opposite to the second guide portion.

13. The electrical apparatus of claim 9, wherein the first guide portion and the first side have an acute angle, and the second guide portion and the second side have an acute angle.

14. The electrical apparatus of claim 9, further comprising a connection hole for the installation of an axis on the case.

15. The electrical apparatus of claim 9, further comprising a hooking portion for the cover to hook onto the case.

16. The electrical apparatus of claim 9, wherein the case is a mobile electrical apparatus case.

17. The electrical apparatus of claim 9, wherein the container is a SIM card container of a mobile electrical apparatus and the moving component is a SIM card.

* * * * *